Patented Sept. 13, 1949

2,481,744

UNITED STATES PATENT OFFICE 2,481,744

3':4'-PHTHALOYLACRIDONES

Robert Norman Heslop, Francis Irving and Alistair Livingston, Blackley, Manchester, England, assignors to Imperial Chemical Industries Limited, a corporation of Great Britain No Drawing. Application August 14, 1945, Serial No. 610,868. In Great Britain August 15, 1944

3 Claims. (Cl. 260—276)

This invention relates to new vat dyes of the phthaloylacridone series and more particularly it relates to a process for the manufacture of blue or violet vat dyes of excellent light fastness and of good level dyeing properties.

According to the invention we provide a process for the manufacture of 3':4'-phthaloylacridones of the formula:

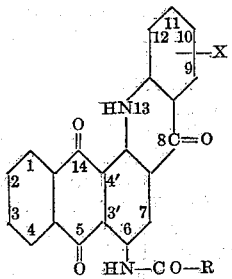

wherein X is an alkanesulphonyl radical and R is an aryl radical, which comprises bringing about ring closure in known manner of a compound of the formula:

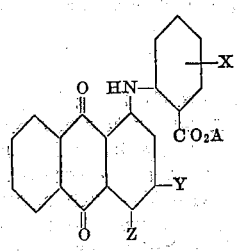

wherein X has the meaning given above, Y stands for hydrogen, halogen or a sulphonic acid group and Z is an aroylamino group or an amino group or a halogen atom, A is hydrogen or alkyl, and, where Z is not already an aroylamino group, converting it thereto by known means.

Where Y in the resulting dyestuff is halogen or a sulphonic acid group it is advantageous to replace the said groups by hydrogen by suitable means at some convenient stage. Thus for example when Y is halogen it may be replaced by hydrogen by the method described in our British application No. 14,598/44, wherein the halogen compound is treated with a reducing agent then with an oxidizing agent, as more particularly illustrated hereinafter in Example 1.

Starting materials for the process of the invention where, in the formula, Z is NH₂, may be made by condensation of a 1-amino-4-halogenoanthraquinone carrying such other substituents as may be desired with an o-aminobenzene carboxylic acid carrying in appropriate position an alkanesulphonyl radical. Starting materials where, in the formula, Z is a halogen atom or an aroylamino group may be made either by condensation of a 1-aminoanthraquinone carrying in the 4-position the halogen atom or the aroylamino group with an o-halogenobenzenecarboxylic acid or its ester or by condensation of a 1-halogenoanthraquinone carrying in the 4-position the halogen atom or the aroylamino group with an o-aminobenzenecarboxylic acid.

Suitable starting materials for use in the process of the invention include for example 2-bromo - 1 - amino - 4 - (4'-methanesulphonyl-2' - carboxyanilino) - anthraquinone, 2-bromo-1-amino-4-(2'-carboxy - 5' - n - butanesulphonylanilino) anthraquinone, 1 - amino-4-(2'-carboxy-5'-methanesulphonylanilino)-anthraquinone, 1-benzoylamino - 4-(2'-carbomethoxy-4'-methanesulphonylanilino) - anthraquinone, 1 - benzoylamino - 4 - (2' - carbomethoxy - 6' - methanesulphonylanilino) anthraquinone, 4-chloro-1-(2'-carboxy - 5' - methanesulphonylanilino) anthraquinone, 2-bromo - 1 - amino-4-(2'-carboxy-5'-methanesulphonylanilino) anthraquinone, 2-bromo - 1 - amino - 4(2'-carboxy - 3' - methanesulphonylanilino) anthraquinone and 1-amino-4(4' - methanesulphonyl - 2' - carboxyanilino) - anthraquinone-2-sulphonic acid.

The ring-closure of the starting materials to give the 3':4'-phthaloylacridone is brought about as said in any known manner for effecting the ring-closure of compounds of this kind, for example by treatment with an acidic substance, for example chlorosulphonic acid, or by treatment with an alkaline solution of sodium hydrosulphite.

The symbol R in the formula for the new dyestuffs given above, stands, as said, for an aryl radical. This may for example be a phenyl radical, which may be substituted or not as, for instance, by halogen, methyl, alkanesulphonyl, aralkanesulphonyl or benzenesulphonyl radicals, as illustrated in the following examples.

Where Z in the formula given above for the starting material is an amino group then, as said, this is converted, after ring-closure, to an aroylamino group by known means, such as for example by treatment with a suitable aroyl halide for example benzoyl chloride or an alkane, aralkane- or benzene-sulphonyl substituted benzoyl chloride. Where Z in the formula given above is halogen it is converted, after ring closure, into an aroylamino group by known means for example by treatment with for example ammonia, or by treatment with for example p-toluene sulphonamide and then hydrolysing, whereby it is converted into an amino group which may then be acylated by for example treatment with an appropriate aroyl halide.

The new dyestuffs are vat dyestuffs which dye cotton in blue or violet level shades of excellent light fastness.

The invention is illustrated but not limited by the following examples in which the parts are by weight:

*Example 1*

1 part of 2-bromo-1-amino-4-(4'-methanesulphonyl-2'-carboxyanilino)anthraquinone is added during 20 minutes to 5 parts of chlorosulphonic acid stirred at 15–20° C. and the mixture is stirred at 20–23° C. during 1 hour. The yellowish-brown solution so obtained is poured slowly into an excess of cold water and the precipitated material is filtered off, washed with water and dried.

The 7-bromo-6-amino-10-methanesulphonyl-3':4'-phthaloylacridone so-obtained is a greenish blue solid which dissolves in caustic soda solution on the addition of sodium hydrosulphite to give a purple-brown vat. It may be treated so as to remove the bromine atom in the 2-position of the anthraquinone nucleus as follows: 1 part of the substance is ground to a thin paste with 45 parts of water. This paste is then warmed to 50° C. and 2 parts of sodium carbonate are added thereto followed by 1 part of sodium hydrosulphite, whereupon the mixture is heated at 60° C. during 1 hour. To the suspension so obtained there are added 0.3 parts of sodium m-nitrobenzene sulphonate and the blue solid is then filtered off, washed with water and dried. The dyestuff thus obtained may, if desired, be purified by crystallisation from aniline whereby it is obtained in the form of bright blue crystals which dissolve in concentrated sulphuric acid to give a brownish-yellow solution. This substance, 6-amino-10-methanesulphonyl-3':4'-phthaloylacridone dyes cotton in bright blue shades from a purple vat.

It is acylated by heating 40 parts thereof in 500 parts of nitrobenzene with 25 parts of benzoyl chloride at 160–165° C. during 90 minutes. The reaction mixture is then cooled, the solid is filtered off, washed free from nitrobenzene with ethanol and dried. The product so obtained, 6-benzoylamino-10-methanesulphonyl-3':4'-phthaloylacridone, dyes cotton from a deep violet vat in purple shades which change to a very fast reddish blue when soaped.

6-m-chlorobenzoylamino-10-methanesulphonyl-3':4'-phthaloylacridone, made by conducting the acylation with m-chlorobenzoyl chloride, dyes cotton in shades which after soaping are a fast bright bluish violet. 6-anisylamino-10-methanesulphonyl-3':4'-phthaloylacridone and 6-p-toluyl-10-methanesulphonyl-3':4'-phthaloylacridone, made respectively by acylating with anisyl chloride and p-toluyl chloride dye cotton in shades which when soaped are reddish blue.

Alternatively 6-amino-10-methanesulphonyl-3':4'-phthaloylacridone is acylated by heating a mixture of 35 parts thereof with 500 parts of nitrobenzene, 32 parts of p-methanesulphonylbenzoyl chloride and 1 part of pyridine to 155–160° C. during 2½ hours with constant stirring. The mixture is then cooled and the blue-violet crystalline deposit is filtered off and washed free from nitrobenzene with ethanol. It is then dried. The dyestuff so obtained 6-p-methanesulphonylbenzoylamino-10-methanesulphonyl-3':4'-phthaloylacridone dissolves in concentrated sulphuric acid to give a brownish-orange solution and it dyes cotton from a violet vat in reddish-blue shades which change to a red-violet when soaped and have a very high fastness to light.

6-p-phenylmethanesulphonylbenzoylamino-10-methanesulphonyl-3':4'-phthaloylacridone obtained by substituting for p-methanesulphonylbenzoyl chloride an equivalent amount of p-phenylmethanesulphonylbenzoyl chloride dyes cotton in shades which when soaped are a fast reddish blue.

The 2-bromo-1-amino-4-(p-methanesulphonyl-o-carboxyanilino)anthraquinone used in the above example may be made by heating 100 parts of 2:4-dibromo-1-aminoanthraquinone and 75 parts of 5-methanesulphonylanthranilic acid in solution in 500 parts of phenol with 27 parts of potassium acetate and 1 part of cuprous chloride with stirring at 60° C. until a homogeneous fluid is obtained, then adding slowly 27 parts of potassium carbonate and thereafter heating to 125° C. during 30 minutes and so maintaining during 4 hours. By diluting with 400 parts of ethanol, filtering and further diluting the filtrate with ethanol, then filtering again and washing and drying the residue 2-bromo-1-amino-4-(4'-methanesulphonyl-2'-carboxyanilino)anthraquinone is isolated as a blue solid which dissolves in concentrated sulphuric acid to give a blue solution which, when warmed, becomes orange-brown. The 5-methane-sulphonyl-anthranilic acid used in this preparation is obtained from 6-nitro-3-aminobenzoic acid. This substance is first diazotised; the resultant diazonium salt is caused to react with potassium ethyl xanthate and the product is treated with dimethyl sulphate to give 6-nitro-3-methylmercaptobenzoic acid. This substance is oxidised by means of hydrogen peroxide in acetic acid solution and the 6-nitro-3-methanesulphonylbenzoic acid so obtained gives on reduction the desired product.

*Example 2*

2-bromo-1-amino-4-(2'-carboxy-5'-methanesulphonylanilino)anthraquinone is treated with chlorosulphonic acid as is described in Example 1 in the case of 2-bromo-1-amino-4-(4'-methanesulphonyl-2'-carboxyanilino)anthraquinone to give 7-bromo-6-amino-11-methanesulphonyl-3':4'-phthaloylacridone which is a greenish-blue solid which dissolves in concentrated sulphuric acid to give an orange-brown solution. This substance is converted into 6-amino-11-methanesulphonyl-3':4'-phthaloylacridone by the methods described in Example 1 for the conversion of 7-bromo-6-amino-10-methanesulphonyl-3':4'-phthaloylacridone and the product is a bright blue crystalline material which dissolves in concentrated sulphuric acid to give a brownish yellow solution and which dyes cotton from a deep blue-violet vat in blue shades which are redder and slightly duller than those obtained using 6-amino-10-methanesulphonyl-3':4'-phthaloylacridone.

6-benzoylamino-11-methanesulphonyl-3':4'-phthaloylacridone is obtained from the amino compound by benzoylation as is described in Example 1 in the case of 6-benzoylamino-10-methanesulphonyl-3':4'-phthaloylacridone. It crystallises from nitrobenzene in dark blue-violet crystals and dyes cotton from a deep blue-violet vat in reddish-blue shades which become less red when soaped.

6-p-toluylamino-11-methanesulphonyl - 3':4'-phthaloylacridone and 6-anisylamino-11-methanesulphonyl-3':4'-phthaloylacridone, obtained by substituting equivalent amounts respectively of p-toluyl chloride and anisyl chloride for benzoyl chloride dye cotton in shades which when soaped are reddish blue.

6 - p - methanesulphonylbenzoylamino - 11-methanesulphonyl-3':4'-phthaloylacridone is obtained by heating 35 parts of 6-amino-11-methanesulphonyl-3':4'-phthaloylacridone with 32 parts of p-methanesulphonylbenzoyl chloride in 500 parts of nitrobenzene containing 1 part of pyridine for 2½ hours at 155-160° C. The reaction mixture is cooled, the solid deposit is filtered off washed and dried and there is obtained a dark blue-violet crystalline substance which dyes cotton from a dull blue vat in reddish-blue shades which become greener and brighter when soaped and have excellent fastness to light.

6 - p - n - butanesulphonylbenzoylamino-11-methanesulphonyl-3':4' - phthaloylacridone obtained similarly using p-n-butanesulphonylbenzoyl chloride in place of p-methanesulphonylbenzoyl chloride dyes cotton in shades which when soaped are bright blue.

6-p-benzenesulphonylbenzoylamino-11 - methanesulphonyl-3':4'-phthaloylacridone and 6-p-(2:6 - dichlorophenyl) - methanesulphonylbenzoylamino-11-methanesulphonyl-3':4'-phthaloylacridone obtained by using respectively diphenylsulphone-4-carboxylic acid chloride and p-(2:6-dichlorophenyl) methanesulphonylbenzoyl chloride in place of p-methanesulphonylbenzoyl chloride dye cotton in shades which when soaped are reddish blue.

The 2-bromo-1-amino-4-(2'-carboxy-5'-methanesulphonylanilino) anthraquinone used in the process described in the above example may be prepared by heating together 300 parts of 2:4-dibromo-1-aminoanthraquinone and 230 parts of 4-methanesulphonylanthranilic acid in 1500 parts of phenol with addition of 3 parts of cuprous chloride, 81 parts of potassium acetate and 81 parts of potassium carbonate, the process being conducted in the manner described above for the preparation of the 2-bromo-1-amino-4-(4'-methanesulphonyl-2' - carboxyanilino) anthraquinone used in Example 1. 4-methanesulphonyl-anthranilic acid for this purpose may be made by nitration of methyl-p-tolyl-sulphone to give methyl-2-nitro-4-methylphenylsulphone, and oxidation of this substance to give 2-nitro-4-methanesulphonylbenzoic acid which is then reduced by means for example of ferrous sulphate in ammonia solution to 4-methanesulphonylanthranilic acid.

*Example 3*

2-bromo-1-amino-4(2'-carboxy-3' - methanesulphonylanilino) anthraquinone is converted into 6-amino-9-methanesulphonyl-3':4' - phthaloylacridone by processes exactly parallel with those described in Example 1 for the conversion of 2-bromo-1-amino-4 - (4' - methanesulphonyl - 2'-carboxyanilino) anthraquinone to 6-amino-10-methanesulphonyl-3':4'-phthaloylacridone. The product is a dull blue crystalline solid which dyes cotton from a blue-violet vat in bright blue shades which become weaker and duller when boiled in aqueous soap solution. It is converted into 6-benzoylamino - 9 - methanesulphonyl - 3':4'-phthaloylacridone by benzoylation by the method described in the case of 6-benzoylamino-10-methanesulphonyl-3':4'-phthaloylacridone in Example 1. The benzoyl derivative crystallises in red-violet needles which dye cotton from a violet vat in reddish-blue shades which when soaped become bright violet shades of very high fastness to light.

6-p-toluylamino-9-methanesulphonyl - 3':4' - phthaloylacridone, 6-anisylamino - 9 - methanesulphonyl-3':4'-phthaloylacridone and 6-m-chlorobenzoylamino - 9 - methanesulphonyl - 3':4' - phthaloylacridone made by using respectively, in place of benzoyl chloride, p-toluyl chloride, anisyl chloride and m-chlorobenzoylchloride in equivalent amounts, dye cotton in shades which when soaped are violet.

6-p-methanesulphonylbenzoylamino-9 - methanesulphonyl-3':4'-phthaloylacridone is made by treatment of 6-amino-9-methanesulphonyl-3':4'-phthaloylacridone with p-methanesulphonylbenzoyl chloride by the method described in Example 2 for a similar treatment of 6-amino-11 - methanesulphonyl - 3':4'-phthaloylacridone. There is obtained a purple crystalline substance, the crystals possessing a bronze reflex. It dyes cotton from a reddish blue vat in violet shades having very good fastness to light.

6 - p-n-butanesulphonylbenzoylamino-9-methanesulphonyl-3':4'-phthaloylacridone, 6-p-phenylmethanesulphonylbenzoylamino-9-methanesulphonyl-3':4'-phthaloylacridone and 6-m-methanesulphonylbenzoylamino-9-methanesulphonyl-3':4'-phthaloylacridone, made by substitution of p-methanesulphonylbenzoyl chloride by the appropriate acid chloride dye cotton in shades which when soaped are violet.

The 2 - bromo-1-amino-4(2'-carboxy-3'-methanesulphonylanilino) anthraquinone used in the process described in the above example may be obtained by condensation of 2:4-dibromo-1-aminoanthraquinone with 6-methanesulphonylanthranilic acid in the manner described above for the preparation of the isomeric starting material used in the process of Example 1. It is a blue-violet crystalline substance which dissolves in concentrated sulphuric acid to give a reddish-blue solution which becomes orange-yellow when warmed. The 6-methanesulphonylanthranilic acid used in this preparation may be obtained from 6-nitroanthranilic acid (made as described by Rule and Smith, Journal of the Chemical Society, 1937, page 1101). This is first diazotised, the diazonium salt is then caused to condense with potassium ethyl xanthate, and the condensation product is methylated with dimethyl sulphate to give 2 - nitro - 6 - methylmercaptobenzoic acid. This is oxidised by means of hydrogen peroxide in glacial acetic acid solution to 2-nitro-6-methanesulphonylbenzoic acid which may be reduced, for example by means of ferrous sulphate in aqueous ammonia solution to 6-methanesulphonylanthranilic acid.

*Example 4*

2 - bromo-1-amino-4(2'-carboxy-5'-n-butanesulphonylanilino) anthraquinone is treated with chlorosulphonic acid by the method described in Example 1 and there is obtained 7-bromo-6-amino-11-n-butanesulphonyl-3':4'-phthaloylacridone.

This substance is converted into 6-amino-11-n-butanesulphonyl - 3':4'-phthaloylacridone by method described in Example 1 and this is a bright blue crystalline material which dyes cotton from a deep blue-violet vat in blue shades which are greener than those obtained using 6-amino - 11-methanesulphonyl-3':4'-phthaloylacridone. This substance is converted into 6-benzoylamino - 11-n-butanesulphonyl- 3':4'-phthaloylacridone by benzoylation as described in Example 1 in the case of 6-benzoylamino-10-methanesulphonyl-3':4'-phthaloylacridone. The benzoyl derivative dyes cotton in shades which when soaped are bright blue.

6-p-methanesulphonylbenzoylamino- 11 -n-butanesulphonyl-3':4'-phthaloylacridone is made by treatment of 6-amino-11-n-butanesulphonyl-3':4'-phthaloylacridone with p-methanesulphonylbenzoyl chloride by the method described in Example 2 for a similar treatment of 6-amino-11 - methanesulphonyl - 3':4'- phthaloylacridone. The product dyes cotton in shades which when soaped are reddish blue.

The 2 - bromo-1-amino-4(2'-carboxy-5'-n-butanesulphonylanilino) anthraquinone, used in the process described in the above example may be prepared by heating together 300 parts of 2:4-dibromo-1-amino-anthraquinone, 169 parts of 4-n-butanesulphonyl-anthranilic acid, 1500 parts of phenol, 3 parts of copper acetate, 46 parts of potassium acetate and 46 parts of potassium carbonate, the process being conducted in the manner described in Example 1 for the preparation of 2-bromo-1-amino-4(4'-methanesulphonyl-2'-carboxy-anilino) anthraquinone.

4-n-butanesulphonylanthranilic acid may be made by nitration of n-butyl p-tolyl sulphone to give n-butyl 2-nitro-4-methylphenyl sulphone which when successively reduced and acylated gives n-butyl 2-acetylamino-4-methylphenyl sulphone which is then oxidised with an aqueous solution of potassium permanganate and magnesium sulphate and subsequently hydrolysed to 4-n-butanesulphonylanthranilic acid.

Example 5

1 - amino-4(2'-carboxy-5'-methanesulphonylanilino) anthraquinone is treated with chlorosulphonic acid as is described in Example 1 in the case of 2-bromo-1-amino-4(4'-methanesulphonyl-2'-carboxyanilino) anthraquinone to give 6 - amino-11-methanesulphonyl-3':4'-phthaloylacridone identical with that prepared as described in Example 2.

The 1 - amino - 4(2' - carboxy-5'-methanesulphonylanilino) anthraquinone may be prepared by treating an alkaline solution of 1-amino-4(2'-carboxy - 5' - methanesulphonylanilino)anthraquinone-2-sulphonic acid with glucose at 60° C. for 45 minutes. The product is then precipitated by addition of salt, filtered off and washed free from alkali with 2% brine.

The solution of 1-amino-4(2'-carboxy-5'-methanesulphonylanilino) anthraquinone -2- sulphonic acid used in this preparation may be obtained by adding 4 parts of cuprous chloride and 40 parts of crystalline sodium acetate to a solution of 89 parts of sodium 1-amino-4-bromoanthraquinone-2-sulphonate in 640 parts of water stirred at 90° C. 43 parts of 4-methanesulphonylanthranilic acid dissolved in 200 parts of water containing 14 parts of sodium carbonate at 90° C. are then added and the mixture is stirred at 89–91° C. for 6 hours. The solution is cooled, acidified and the precipitate is washed with boiling dilute hydrochloric acid until the filtrates are colourless. The residue is extracted with dilute caustic soda solution to obtain the bright blue solution of 1-amino-4(2'-carboxy-5'-methanesulphonylanilino) anthraquinone.

Example 6

30 parts of 1-benzoylamino-4(2'-carbomethoxy -4'- methanesulphonylanilino) anthraquinone is made to a paste with 300 parts of ethanol and then there is added 1500 parts of water containing 36 parts of sodium hydroxide and 50 parts of sodium hydrosulphite. The solution is stirred at 40° C. for 30 minutes and is then cooled. A current of air is then blown through it and the precipitate which is formed is filtered off. The product, 6 - benzoylamino-10-methanesulphonyl-3':4'-phthaloylacridone is identical with that obtained as described in Example 1.

The 1-benzoylamino - 4(2' - carbomethoxy-4'-methanesulphonylanilino) anthraquinone may be obtained by stirring 28 parts of 1-amino-4-benzoylamino-anthraquinone, 27 parts of methyl 5-methane-sulphonyl-2-chlorobenzoate, 1 part of cuprous chloride, 9 parts of potassium acetate and 200 parts of nitrobenzene at 200–210° C. for 16 hours. Ethanol is then added and the dark precipitate is filtered off and crystallised from pyridine. The product is a bluish violet powder which dissolves in sulphuric acid to give a green solution.

The methyl 5 - methanesulphonyl-2-chlorobenzoate used in this preparation may be obtained by the Sandmeyer reaction from 5-methane-sulphonylanthranilic acid the resulting 5-methanesulphonyl-2-chloro-benzoic acid being esterified with methyl alcohol.

Example 7

1-benzoylamino-4-(2'-carbomethoxy-6'-methanesulphonylanilino) anthraquinone is converted to 6 - benzoylamino-12-methanesulphonyl-3':4'-phthaloylacridone by the process described in Example 6 for 1-benzoylamino-4(2'-carbomethoxy-4'-methanesulphonylanilino) anthraquinone. The product, a reddish blue powder, dissolves in sulphuric acid to give an orange brown solution, and dyes cotton from a purple vat in shades which when soaped are a reddish blue.

The 1-benzoylamino - 4(2' - carbomethoxy-6'-methanesulphonylanilino) anthraquinone used in this example may be obtained by stirring a mixture of 28 parts of 1-amino-4-benzoylamino-anthraquinone, 32 parts of methyl 2-bromo-3-methanesulphonylbenzoate, 1 part of cuprous chloride, 10 parts of potassium acetate and 200 parts of naphthalene at 215° C. for 12 hours. The mixture is cooled, diluted with 200 parts of benzene and is allowed to stand overnight. The precipitate is filtered off and crystallised from pyridine which dissolves in sulphuric acid to give a green solution.

The methyl 2 - bromo - 3 - methanesulphonylbenzoate used in this preparation is obtained from 3-mercapto-2-toluidine by methylation and Sandmeyer reaction to give 2-bromo-3-methylmercaptotoluene which is then oxidised to 2-bromo-3-methanesulphonylbenzoic acid and finally esterified.

Example 8

1 - amino-4(2'-carboxy-4'-methanesulphonylanilino) anthraquinone is treated with chlorosulphonic acid as is described in Example 1 in the case of 2-bromo-1-amino-4(2'-carboxy-4'-methanesulphonylanilino) anthraquinone to give 6-amino - 10 - methanesulphonyl-3':4'-phthaloylacridone identical with that obtained in Example 1.

The 1-amino-4(2'-carboxy-4'-methanesulphonylanilino)anthraquinone may be obtained by heating 92 parts of 5-methanesulphonyl-2-chlorobenzoic acid and 120 parts of 1:4-diaminoanthraquinone, 450 parts of phenol, 27 parts of potassium acetate and 3 parts of cuprous chloride with stirring at 60° C., then adding 27 parts of potassium carbonate and thereafter heating to 125° C. during 30 minutes and thus during 16 hours. By diluting with ethanol and filtering a dark blue precipitate is obtained which is extracted with dilute ammonia solution. The blue solution obtained is filtered and the filtrate acidified to give a bright blue precipitate of 1-amino-4(2'-carboxy - 4' - methanesulphonylanilino)-anthraquinone, which dissolves in sulphuric acid to give a reddish blue solution.

*Example 9*

1 part of 4-chloro-1-(2'-carboxy-5'-methanesulphonylanilino) anthraquinone is added to 10 parts of chlorosulphonic acid, stirred at 20–25° C. and the green solution obtained is heated to 60° C. and held at 55–60° C. for 1 hour. The yellowish brown solution so obtained is poured slowly into an excess of cold water and the precipitated solid is filtered off, extracted with hot dilute aqueous ammonia solution until the filtrates are colourless and dried.

The 6-chloro - 11 - methanesulphonyl-3':4'-phthaloylacridone so obtained is a bluish red solid and it is converted to 6-amino-11-methanesulphonyl-3':4'-phthaloylacridone by stirring 77 parts thereof with 70 parts of p-toluenesulphonamide, 22 parts of potassium acetate, 3 parts of copper acetate and 700 parts of dry nitrobenzene at 200–205° C. for 16 hours. The nitrobenzene is then removed by steam distillation and the residue hydrolysed by dissolving it in cold sulphuric acid and heating the solution at 70° C. for 1 hour. The brown solution is poured slowly into an excess of cold water, and the precipitated solid is filtered off, washed with water, dried and suspended in boiling aniline. The suspension is allowed to cool slowly, filtered and washed with aniline till the filtrates are no longer reddish brown in colour. The aniline is then washed out with ethanol and the residue, 6-amino-11-methanesulphonyl - 3':4' - phthaloylacridone is identical with the product obtained as described in Example 2.

The 4 - chloro-1-(2'-carboxy-5'-methanesulphonylanilino)-anthraquinone may be obtained stirring 145 parts of 4-methanesulphonylanthranilic acid, 51 parts of potassium acetate, 51 parts of potassium carbonate, 6 parts of copper acetate, 230 parts of 1:4-dichloroanthraquinone and 1500 parts of phenol at 123–127° C. for 16 hours. The phenol is then steam distilled off and the residual suspension is made alkaline with potassium carbonate and filtered hot. The filtrate is acidified and the precipitate of 4-chloro-1(2'-carboxy - 5' - methanesulphonylanilino) anthraquinone is filtered off, washed and dried.

We claim:
1. The vat dyes of the general formula:

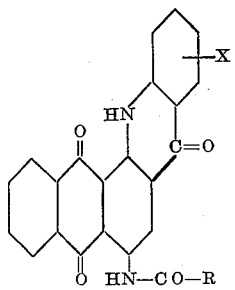

wherein X is an alkanesulphonyl radical and R is a monocyclic aryl radical.

2. The vat dyes of the formula:

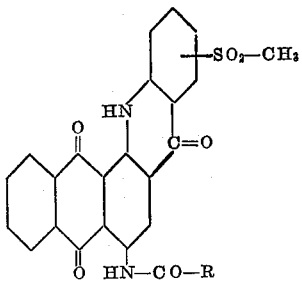

wherein R is a monocyclic aryl radical.

3. The vat dyes of the formula:

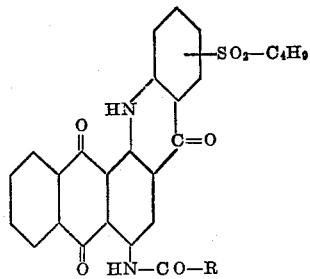

wherein R is a monocyclic aryl radical.

ROBERT NORMAN HESLOP.
FRANCIS IRVING.
ALISTAIR LIVINGSTON.

REFERENCES CITED

The following references are of record in the file of this patent:

UNITED STATES PATENTS

| Number | Name | Date |
|---|---|---|
| 961,047 | Ullmann | June 7, 1910 |
| 998,772 | Hessenland | July 25, 1911 |
| 1,002,270 | Hessenland | Sept. 5, 1911 |
| 2,005,321 | Kunz et al. | June 18, 1935 |
| 2,052,592 | Wuertz et al. | Sept. 1, 1936 |
| 2,133,274 | Dettwyler | Oct. 18, 1938 |
| 2,374,891 | Peter | May 1, 1945 |

FOREIGN PATENTS

| Number | Country | Date |
|---|---|---|
| 894 | Great Britain | 1911 |
| 287,614 | Germany | Sept. 25, 1915 |